US011469887B1

(12) United States Patent
Rubira Branco et al.

(10) Patent No.: US 11,469,887 B1
(45) Date of Patent: Oct. 11, 2022

(54) REMOTE HARDWARE EXECUTION SERVICE WITH CUSTOMER CONSENTED DEBUGGING

(71) Applicant: Amazon Technologies, Inc., Seattle, WA (US)

(72) Inventors: Rodrigo Rubira Branco, Plano, TX (US); Shay Gueron, Haifa (IL); John Totah, Half Moon Bay, CA (US)

(73) Assignee: Amazon Technologies, Inc., Seattle, WA (US)

( * ) Notice: Subject to any disclaimer, the term of this patent is extended or adjusted under 35 U.S.C. 154(b) by 281 days.

(21) Appl. No.: 16/915,771

(22) Filed: Jun. 29, 2020

(51) Int. Cl.
| | |
|---|---|
| *H04L 9/08* | (2006.01) |
| *H04L 41/5061* | (2022.01) |
| *G06N 10/00* | (2022.01) |
| *H04L 9/32* | (2006.01) |
| *G06F 11/36* | (2006.01) |
| *H04L 67/133* | (2022.01) |

(52) U.S. Cl.
CPC .......... *H04L 9/085* (2013.01); *G06F 11/3648* (2013.01); *G06N 10/00* (2019.01); *H04L 9/3234* (2013.01); *H04L 41/5061* (2013.01); *H04L 67/133* (2022.05)

(58) Field of Classification Search
CPC ..... H04L 9/085; H04L 67/133; H04L 9/3234; H04L 41/5061; G06N 10/00; G06F 11/3648
See application file for complete search history.

(56) References Cited

U.S. PATENT DOCUMENTS

| | | | |
|---|---|---|---|
| 6,941,471 | B2 | 9/2005 | Lin |
| 9,053,343 | B1* | 6/2015 | Fuller .................. G06F 21/604 |
| 9,331,984 | B2 | 5/2016 | Matsuo |
| 2017/0220451 | A1* | 8/2017 | Mankovskii ............ H04L 67/10 |
| 2017/0353464 | A1* | 12/2017 | Burch .................. G06F 21/606 |
| 2018/0322298 | A1 | 11/2018 | Momchilov et al. |
| 2021/0067324 | A1* | 3/2021 | Valente .................. H04L 9/088 |

* cited by examiner

*Primary Examiner* — Duc C Ho
(74) *Attorney, Agent, or Firm* — Alexander A. Knapp; Kowert, Hood, Munyon, Rankin & Goetzel, P.C.

(57) ABSTRACT

A system coordinates with remote hardware to execute customer workloads. The system uses an architecture for ensuring trust to ensure that debugging is not performed at the remote hardware while the customer workload is being executed on the remote hardware without customer consent. For example, debugging at the remote hardware may enable an entity performing the debugging to view certain aspects of the customer's workload. The architecture for ensuring trusts uses a shared secret to ensure customer consent is given before debugging can be performed while the customer's workload is being executed on the remote hardware.

20 Claims, 13 Drawing Sheets

US 11,469,887 B1

REMOTE HARDWARE EXECUTION SERVICE WITH CUSTOMER CONSENTED DEBUGGING

BACKGROUND

Debugging techniques may be used to find and resolve bugs, such as an error or flaw in an algorithm or a in a piece of hardware. In some situations a debugging technique may require access to be granted to an entity performing the debugging (e.g. a technician, an engineer, a computer program performing the debugging, etc.) so that the entity has access to data and controls that are not generally accessible. For example, access may be granted to reboot a system or observe the output of a console. Also, in some scenarios, access may be granted to view internal tracing information (e.g. logs about a program or algorithm's execution) and/or internal state information about the computer being debugged.

Some systems may limit debugging access to certain individuals or entities, such as an administrator. Also, such systems may require the administrator to provide information to authenticate the administrator's identity to prevent unauthorized access from being granted to the computer's debugging functionality. Additionally, some systems may provide different levels of access to different categories of administrators. In such systems, trust is placed in the administrator(s) to perform debugging and the trust is granted based on their identity and credentials as an administrator.

In some scenarios, providing access to perform debugging may also expose confidential information to the entity performing the debugging, such as an administrator. For example, algorithms being executed on the computer being debugged and/or data being processed by algorithms being executed on the computer being debugged may be accessible to the entity performing the debugging.

Figure 1:
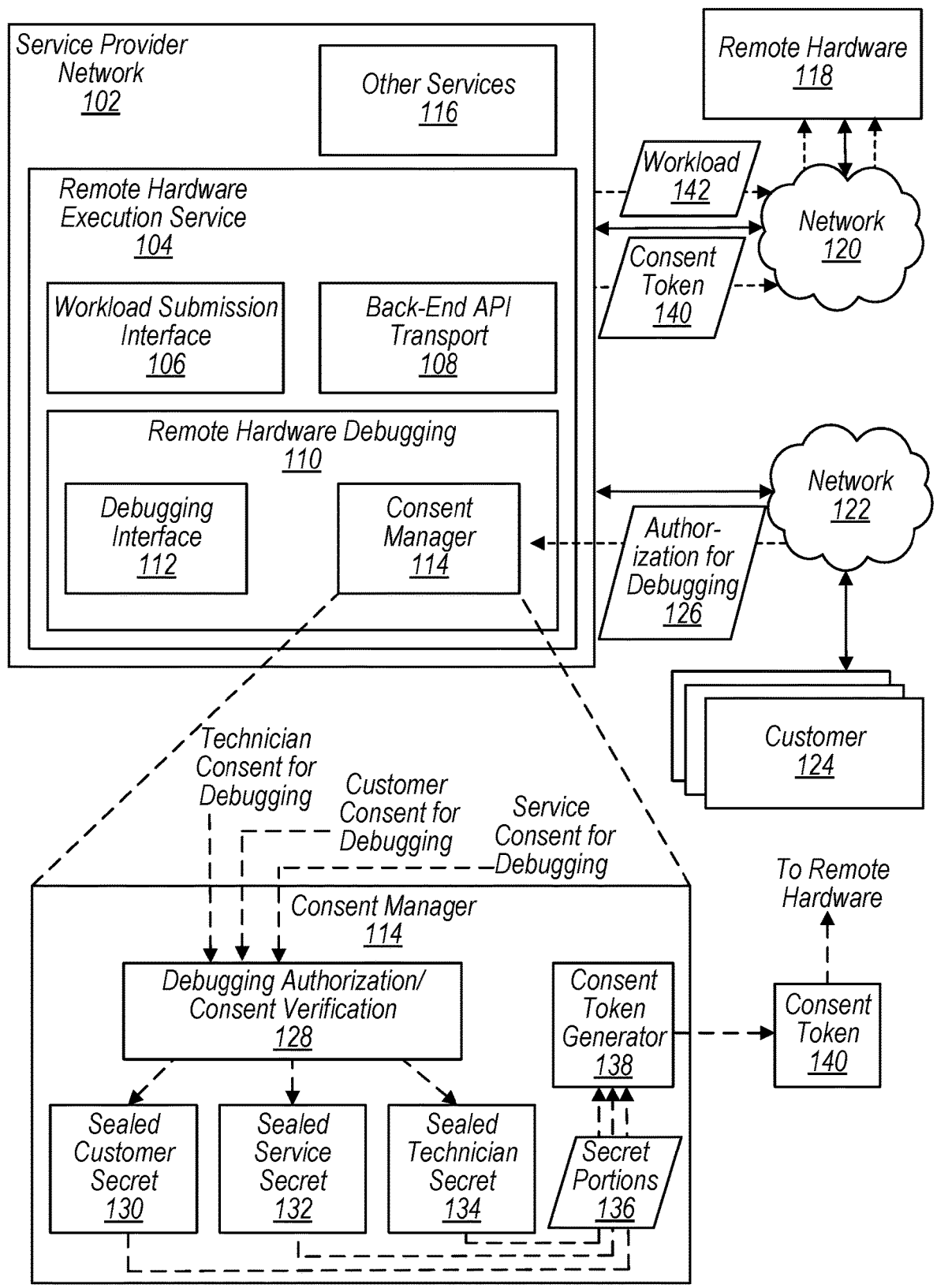
FIG. 1 illustrates a block-diagram of a service provider network that includes a remote hardware execution service that coordinates with remote hardware to execute customer workloads, wherein the remote hardware execution service includes a remote hardware debugging service that requires customer consent to enable debugging at the remote hardware, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and systems for ensuring trust in remote hardware with debugging capabilities. For example, remote hardware may be operated by a third-party or other entity that is not fully trusted to the extent an in-house operator that performs debugging of non-remote hardware is trusted. Therefore, predicating debugging access on the identity or credentials of an administrator alone may be insufficient to guarantee trust. As discussed in more detail below, in some embodiments, in addition to, or instead of, debugging access being predicated on the authenticated identity of an entity, such as an administrator, requesting to perform the debugging, access for debugging may also be predicated on customer consent, wherein the customer is an owner of a workload being executed, or to be executed, on the remote hardware. In such a system, the customer does not solely rely on the operator of the remote hardware to police administrator credentials to ensure trust, but can also be ensured that debugging access to view the customer's workload cannot be granted without the customer's consent. Thus, even if administrator credentials were to fall into the hands of a rogue actor, or if the administrator of the remote hardware was attempting to view the customer's workload without permission, such requests for debugging access would be denied unless customer consent is granted.

In some embodiments, a service provider, such as a cloud computing service provider, etc. may operate a service provider network that offers a plurality of services, such as cloud-computing services to customers of the service provider network. For example, some such services may include virtualized computing services, virtualized data storage services, etc. Additionally, such services may include a remote hardware execution service that enables customers of the provider network to submit workloads to the remote hardware execution service, wherein the remote hardware execution service coordinates with remote hardware providers to execute the customers' workloads on remote hardware operated by the remote hardware providers. For example, some such remote hardware operators may include quantum computing hardware providers, specialized classical computing hardware providers, etc. Also, in some embodiments, a service provider network may provide a hardware testing service that coordinates other customers of the service provider network to execute workloads on remote hardware that is being tested as part of the hardware testing service. Also, in some embodiments, remote hardware may encompass hardware operated by a service provider network that is remote from the customer. In such embodiments, the customer may desire a greater level of trust by ensuring that the customer's workloads will not be debugged by the service provider without the customer's consent.

For example, in some embodiments, a remote hardware provider may be a quantum computing hardware provider that operates one or more quantum computers. In such embodiments, a remote hardware execution service offered by the service provider network may be a quantum computing service. The quantum computing service may enable customers to submit workloads, such as quantum algorithms or quantum circuits, to be executed using a quantum computer of a quantum hardware provider associated with the quantum computing service. In some embodiments, the quantum computing service may receive the customer's quantum algorithm defined in an intermediate representation that is not specific to any one quantum hardware provider. The quantum computing service may translate the customer's quantum algorithm into a hardware specific representation, such as a quantum circuit formatted in accordance with a format for quantum circuits (e.g. quantum gates, etc.) used by a particular quantum hardware provider. The quantum computing service may then transport the hardware specific quantum circuit to the quantum hardware provider for execution. Then, the quantum hardware provider may execute the hardware specific quantum circuit on a quantum computer operated by the quantum hardware provider and provide the results of the execution to the quantum computing service, which may store the results and provide the customer that submitted the quantum algorithm access to the results of the execution of the quantum circuit. In some embodiments, a quantum computing service may execute hybrid workloads on behalf of customers, wherein the workload includes both quantum computing tasks and classical computing tasks. In such embodiments, the quantum computing service may coordinate with a quantum hardware provider to execute the quantum computing tasks and may coordinate with a computing service of the provider network, such as a virtualized computing service, to perform the classical computing tasks of the workload.

As the quantum algorithm and translated hardware specific quantum circuit, and/or hybrid workload may include confidential customer information, the customer and the quantum hardware service may desire to limit access to view the quantum circuit and/or results of executing the quantum circuit, or results of executing the hybrid workload. However, from time to time, it may be necessary to debug the quantum computer executing the customer's quantum circuit and/or to debug the quantum circuit. In such scenarios, granting general permission to the quantum hardware provider (e.g. remote hardware provider) to access the customer's quantum circuit to perform debugging may not satisfy customer trust requirements. Also, such a general grant of access may not satisfy trust requirements of an operator of the quantum computing service. Thus, in such an example, the quantum computing service may coordinate with the quantum hardware provider to put controls in place such that debugging access is blocked during the execution of a customer quantum circuit (e.g. workload), unless the customer has given consent to allow debugging during the execution of the customer's quantum circuit (e.g. workload). In such scenarios, the customer's consent to allow debugging during the execution of the customer's quantum circuit may be verified using a consent token generated as described in more detail below, before access is granted to perform debugging during the execution of the customer's quantum circuit.

As another example, a remote hardware execution service may coordinate with a third-party that operates specialized classical computing hardware. In such an embodiment, the remote hardware execution service may receive a workload from a customer that is to be executed on the specialized classical computing hardware operated by the third-party and formats the received workload in a format used by the specialized classical computing hardware. The remote hardware execution service then submits the properly formatted workload to the specialized classical computing hardware operated by the third party for execution, receives results of the execution, and makes the results accessible to the customer of the remote hardware execution service. However, in a similar manner as described above with regard to the quantum computing execution service, from time to time it may be necessary to perform debugging of the specialized classical computing hardware and/or the customer's workload. Also, as discussed above, the customer trust requirements may not be satisfied by generally granting access to an operator of the third-party remote hardware and/or the remote hardware execution service to perform debugging. Instead, the customer may desire debugging access to only be granted with the customer's consent when the customer's workload is being executed on the specialized classical computing hardware. Thus, in some embodiments, the customer's consent to allow debugging during the execution of the customer's workload may be verified using a consent token generated as described in more detail below, before access is granted to perform debugging during the execution of the customer's workload on the specialized classical computing hardware.

As an additional example, in some embodiments, a service provider network may provide a hardware testing service. In some such embodiments, the service provider network may coordinate with other customers of the service provider network to execute the other customers' workloads on a piece of remote hardware that is being tested as part of the hardware testing service. For example, the other customers may be provided a discount to opt into having the other customer's workloads executed on hardware being tested. For example, customers of an event-driven code execution service, may be provided a discount for opting into allowing their compute jobs to be executed using hardware being tested as opposed to a fleet of hardware of the service provider network that may otherwise be used to execute the customer's compute jobs. However, in order to guarantee confidentiality of the customer's compute jobs, the customers and the service provider network may require that debugging access be blocked while executing the customers' compute jobs unless consent is obtained from the customers to allow debugging access while executing the customers' compute jobs. In such embodiments, the customers' consent may be verified using a consent token generated as described in more detail below, before access is granted to perform debugging during the execution of a given customer's compute job on the hardware being tested.

In some embodiments, a system includes a service provider network comprising one or more computing devices configured to coordinate with remote hardware operated by a third-party to execute workloads of customers of the service provider network and receive from a customer of the service provider network one or more workloads to be executed using the remote hardware operated by the third-party. The one or more computing devices are also configured to enable, with the consent of the customer, debugging operations to be performed at the remote hardware while the workload of the customer is being executed. The remote hardware is configured to block debugging operations during the execution of the customer's workload unless a token indicating the customer's consent for debugging during execution of the customer's workload is provided. In order to generate the token indicating the customer's consent for debugging, the one or more computing devices are configured to store a plurality of portions of a secret in separate logically-sealed containers, wherein a threshold number of the portions of the secret are required to be unsealed in order for the token to be generated. In order to generate the token indicating the customer's consent for debugging, the one or more computing devices are also configured to receive authorization from the customer indicating consent to unseal the customer's portion of the secret, receive authorization from the service provider or a technician/engineer indicating consent to unseal another portion of the secret, determine that unsealed portions of the secret satisfy a threshold number of the portions of the secret required to generate the token, wherein the threshold number cannot be satisfied without the customer's portion of the secret, and generate, in response to determining the unsealed portions of the secret satisfy the threshold number of portions, the token indicating the customer's consent for debugging operations to be performed during execution of the customer's workload. Additionally, the one or more computing devices are configured to provide the token to the remote hardware operated by the third-party to enable debugging to be performed while the workload of the customer is being executed.

In some embodiments, a method includes receiving, from a customer of a service provider network, a workload to be executed using remote hardware, remote from the service provider network, wherein the service provider network is configured to coordinate with the remote hardware to execute the customer's workload. The method also includes restricting debugging operations from being performed on the remote hardware while executing the customer workload unless a token indicating authorization for performing debugging operations during execution of the customer's workload is provided. Additionally, the method includes storing a plurality of portions of a secret in separate logically-sealed containers, wherein a threshold number of the portions of the secret are required to be unsealed in order for the token indicating authorization for performing debugging operations to be generated, receiving authorization from the customer indicating consent to unseal the customer's portion of the secret, receiving authorization from a service of the service provider network or a technician of the service provider indicating consent to unseal another portion of the secret, and generating the token in response to determining the unsealed portions of the secret satisfy the threshold number of portions. Also, the method includes providing the token to the remote hardware to enable debugging to be performed while the workload of the customer is being executed.

In some embodiments, one or more computer-readable media store program instructions, that when executed on or across one or more computing devices, cause the one or more computing devices to cause debugging operations to be restricted from being performed on remote hardware while executing a customer workload on the remote hardware and cause a plurality of portions of a secret to be stored in separate logically-sealed containers, wherein a threshold number of the portions of the secret are required to be unsealed in order for a token indicating authorization for performing debugging operations to be generated. The program instructions, when executed on or across the one or more computing devices, also cause the one or more computing devices to receive authorization from a customer indicating consent to unseal the customer's portion of the secret, receive authorization from a service or a technician of the service provider indicating consent to unseal another portion of the secret, generate the token in response to determining the unsealed portions of the secret satisfy the threshold number of portions, and provide the token to the remote hardware to enable debugging to be performed while a customer workload of the customer is being executed.

Figure 3:
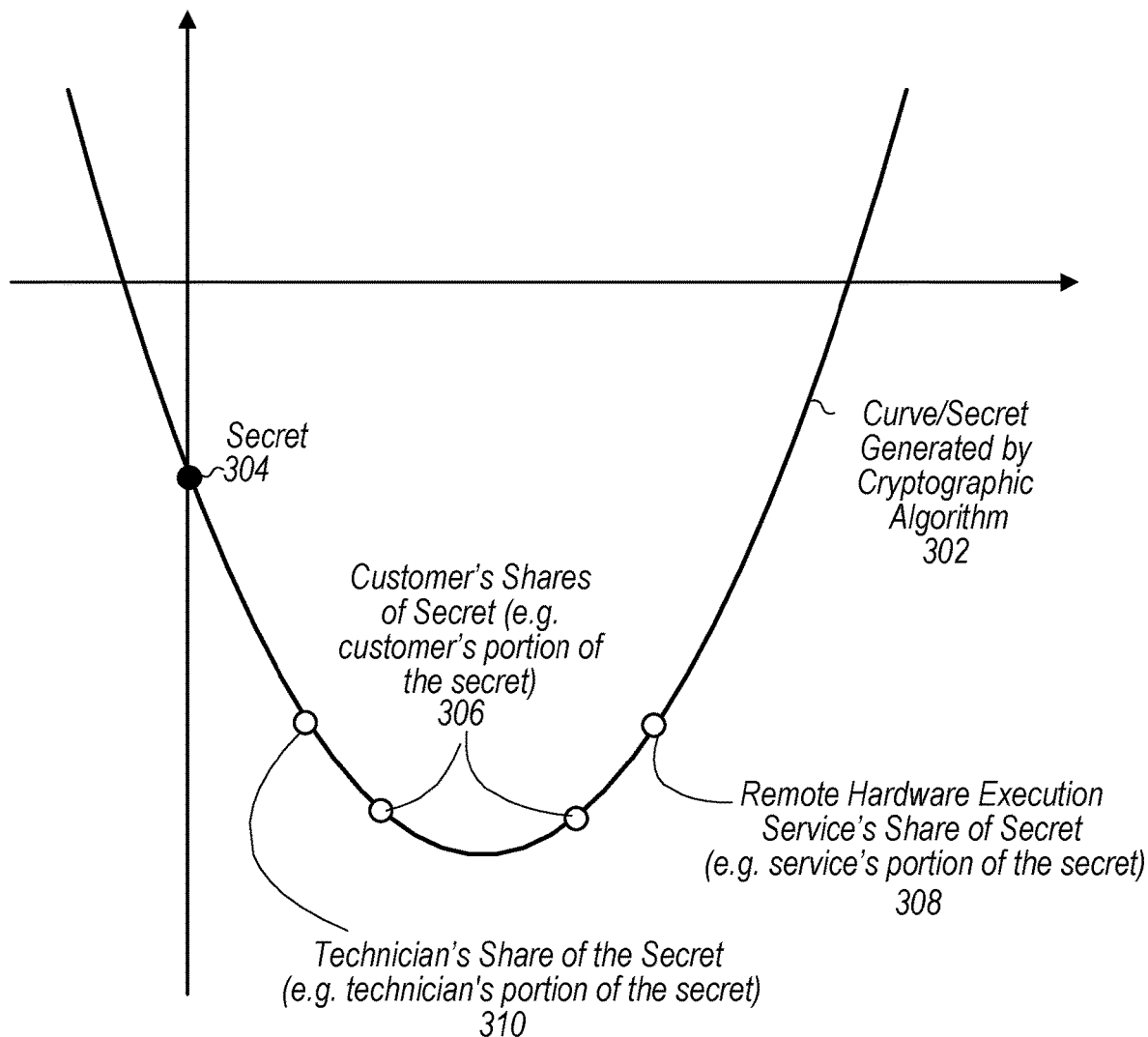
FIG. 3 illustrates an example secret sharing scheme that may be used to generate a secret and secret portions, according to some embodiments.

In some embodiments, a secret used to generate a consent token may be a shared secret generated using a cryptographic algorithm, such as Shamir's Secret Sharing, or other suitable secret sharing strategy. In some embodiments, the secret may be divided into shares such that a minimum number, or threshold number, of the shares is required in order to re-create the secret. As an example, a secret may be divided into four shares, and three of the four shares may be required to re-create the secret. For example, FIG. 3 illustrates a secret generated using a parabola, wherein three points along the parabola are necessary in order to model the parabola to determine the secret, such as the y-intercept of the parabola. In some embodiments, a secret may be divided into more or fewer shares. For example, a secret generated using a line, may only require two shares to reconstruct the secret, a secret generated using a cubic curve may require four points to define the cubic curve needed to reconstruct the secret, etc.

In some embodiments, coordinated consent may be required in order for a consent token to be generated. For example, such a requirement may reduce the probability of trust being compromised because multiple independent parties would be required to conspire together to defeat the trust. For example, in some embodiments, consent may be required to be granted by a customer owning a workload and an additional party, such as the remote hardware execution service or a technician of the remote hardware execution service or a technician of the remote hardware provider. In this way, even if the customer's credentials were compromised such that a rogue actor was impersonating the customer to grant access for debugging, without the consent of another entity such as the service provider network operator and/or technician, debugging would remain blocked. As an example, if a rogue actor within the service provider network were to gain access to the customer's credentials for granting consent to allow debugging, the rogue actor alone would not be able to enable debugging, but would also have to enlist others to provide the service provider's consent and/or the technician's consent for debugging. Such coordinated action is highly unlikely and easier to identify and stop than if a single individual can grant access. Thus, such a scheme provides additional safeguards to ensure customer trust.

Additionally, in some embodiments, a secret is divided such that a portion assigned to the customer comprises more shares than other portions, such as a technician's portion of the secret or the service provider's portion of the secret. For example, in an embodiment wherein three shares of the secret are required to reconstruct the secret, the customer may be assigned two shares, the technician may be assigned a single share, and the service/service provider may be assigned a single share. In this way, the secret cannot be recreated without the customer's consent, even if both the technician and the service/service provider's shares of the secret are obtained. Note that three shares of the secret is given only as an example. In some embodiments, the secret may be divided into other numbers of shares, and the customer, technician, and/or service/service provider may be assigned other numbers of shares. However, in some such embodiments, a number of shares assigned to the customer may be sufficiently large such that the secret cannot be recreated without the customer's shares, even if all the other shares are provided.

FIG. 1 illustrates a block-diagram of a service provider network that includes a remote hardware execution service that coordinates with remote hardware to execute customer workloads, wherein the remote hardware execution service includes a remote hardware debugging service that requires customer consent to enable debugging at the remote hardware, according to some embodiments.

Figure 7:
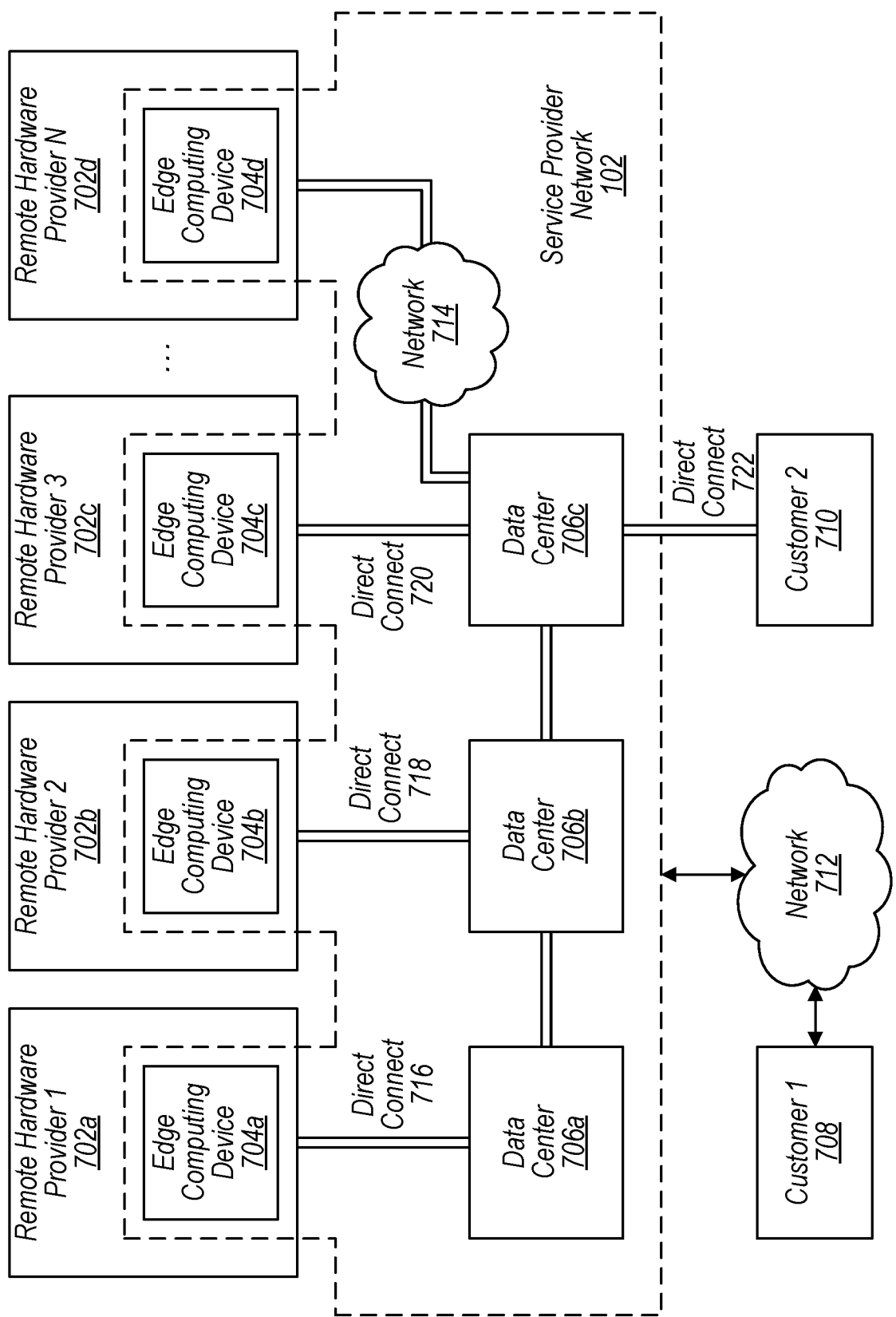
FIG. 7 illustrates an example network architecture for a remote hardware execution service with edge devices physically located at remote hardware provider locations, according to some embodiments.

Service provider network 102 may include various computing devices, networking devices, data storage devices, etc. that implement the service provider network 102. For example, in some embodiments, service provider network 102 may include one or more data centers as illustrated in FIG. 7. In some embodiments, service provider network 102 may be connected to remote hardware 118 via a network 120. In some embodiments, the remote hardware 118 may be hardware operated by a third-party remote hardware provider, such as a quantum computing hardware provider, a specialized classical computing hardware provider, a hardware owner whose hardware is being tested, etc. In some embodiments, network 120 may be a public network, such as the Internet, and a logically isolated connection, such as a virtual private network (VPN) tunnel may connect the remote hardware 118 to service provider network 102 via the network 120. Also, in some embodiments, network 120 may be a dedicated private network connection that establishes a direct connection between the service provider network 102 and a network for a remote hardware provider that operates remote hardware 118. For example, FIG. 7 provides examples of quantum hardware providers connected to service provider network 102 via dedicated direct connections.

Service provider network 102 implements a remote hardware execution service 104 and other services 116. In some embodiments, other services 116, may include a variety of other services, such as a virtualized computing service, virtualized data storage services, database services, machine learning services, etc.

Remote hardware execution service 104 includes a workload submission interface 106, which may include an application programmatic interface (API) for receiving a workload submitted by a customer for execution on remote hardware via the remote hardware execution service 104. In some embodiments, workload submission interface 106, may also, or alternatively, include a graphical user interface, command line interface, console, etc.

Additionally, remote hardware execution service 104 includes back-end API transport 108, which may transport a workload 142 submitted by a customer to remote hardware 118. In some embodiments, workload submission interface 106 may be a public API for accepting workloads and back-end API transport 108 may be a private API that is not publicly accessible. The back-end API transport 108 may enable workloads to be transported from a centralized location that implements the remote hardware execution service 104, such as one or more data centers of a service provider network 102, to remote hardware or an edge computing device at a particular remote hardware provider location where the workload 142 is to be executed, such as remote hardware 118.

Also, the remote hardware execution service 104 includes remote hardware debugging service/module 110, which includes debugging interface 112 and consent manager 114. In some embodiments, a technician or other entity performing debugging operations may utilize debugging interface 112 to perform the debugging operations. Also, consent manager 114, may manage the generation of consent tokens 140, such that debugging operations are only enabled during the execution of a customer workload with the consent of the customer. Also, to increase trust, in some embodiments consent from other entities such as the technician/engineer performing the debugging or consent from the remote hardware execution service 104, may be required.

For example, consent manager 114 may store or otherwise maintain portions of a secret in separate logically sealed containers. Wherein the portions of the secret comprise shares of a secret assigned to entities that may provide consent for debugging operations, such as a customer, a technician/engineer, and/or a service of the service provider network 102, such as the remote hardware execution service 104. While customer consent is required, in some embodiments more or fewer additional parties may participate in providing consent, such that more or fewer portions of the secret may be stored in more or fewer logically sealed containers for the additional parties.

In some embodiments, in order to generate a consent token 140, the consent manager 114 may be required to receive consent from the customer and at least one additional party, such as the technician's consent or the service's consent. In some embodiments, consent may be provided by authenticating the party providing the consent and receiving the consent. For example, a customer may provide a password and/or other form of authentication, and once authenticated may be able to provide consent. In a similar manner, a technician or service providing consent may be authenticated.

In response to providing consent, the customer or other party's portion of the secret stored in the logically sealed containers, such as logically sealed containers 130, 132, and/or 134, may be provided as secret portions 136 to consent token generator 138. The consent token generator 138 may reconstruct the secret using the provided secret portions 136, wherein a threshold number of portions/shares of the secret are required to reconstruct the secret. The reconstructed secret may then be used to generate consent token 140 that is provided to remote hardware 118 to enable debugging on remote hardware 118 while customer workload 142 is being executed.

For example, customer 124 may submit workload 142 via network 122 to workload submission interface 106 and may additionally provide authorization for debugging 126 via network 122 and consent manager 114. In response to receiving the authorization for debugging 126, the consent manager 114 may provide the customer's portion of the secret stored in sealed customer secret logical container 130. Additionally the consent manager may receive the technician's consent or the service's consent and provide the technician's portion of the secret or the service's portion of the secret to consent token generator 138, which may generate consent token 140. The remote hardware execution service 104 may then provide consent token 140 with workload 142 to remote hardware 118 via network connection 120 to enable debugging during the execution of workload 142. In some embodiments, the consent token may be provided concurrently with providing the workload, and/or may be provided subsequent to providing the workload, such as during execution of the workload.

Figure 2A:
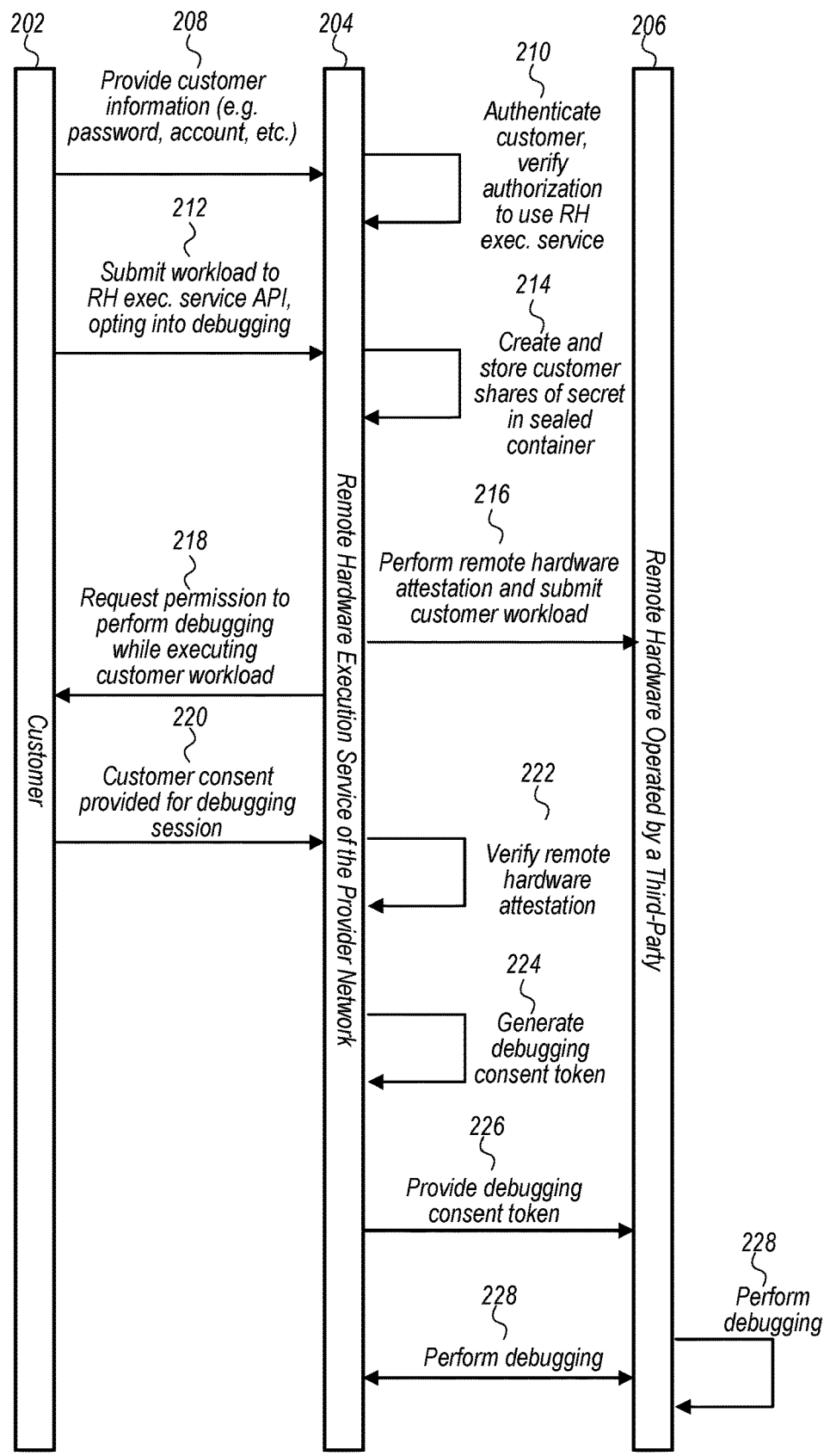
FIGS. 2A-2B illustrates example interactions between a customer, a remote hardware execution service, and remote hardware in order to execute a workload of a customer at the remote hardware and to enable debugging at the remote hardware during execution of the workload with the customer's consent, according to some embodiments.
Figure 2B:
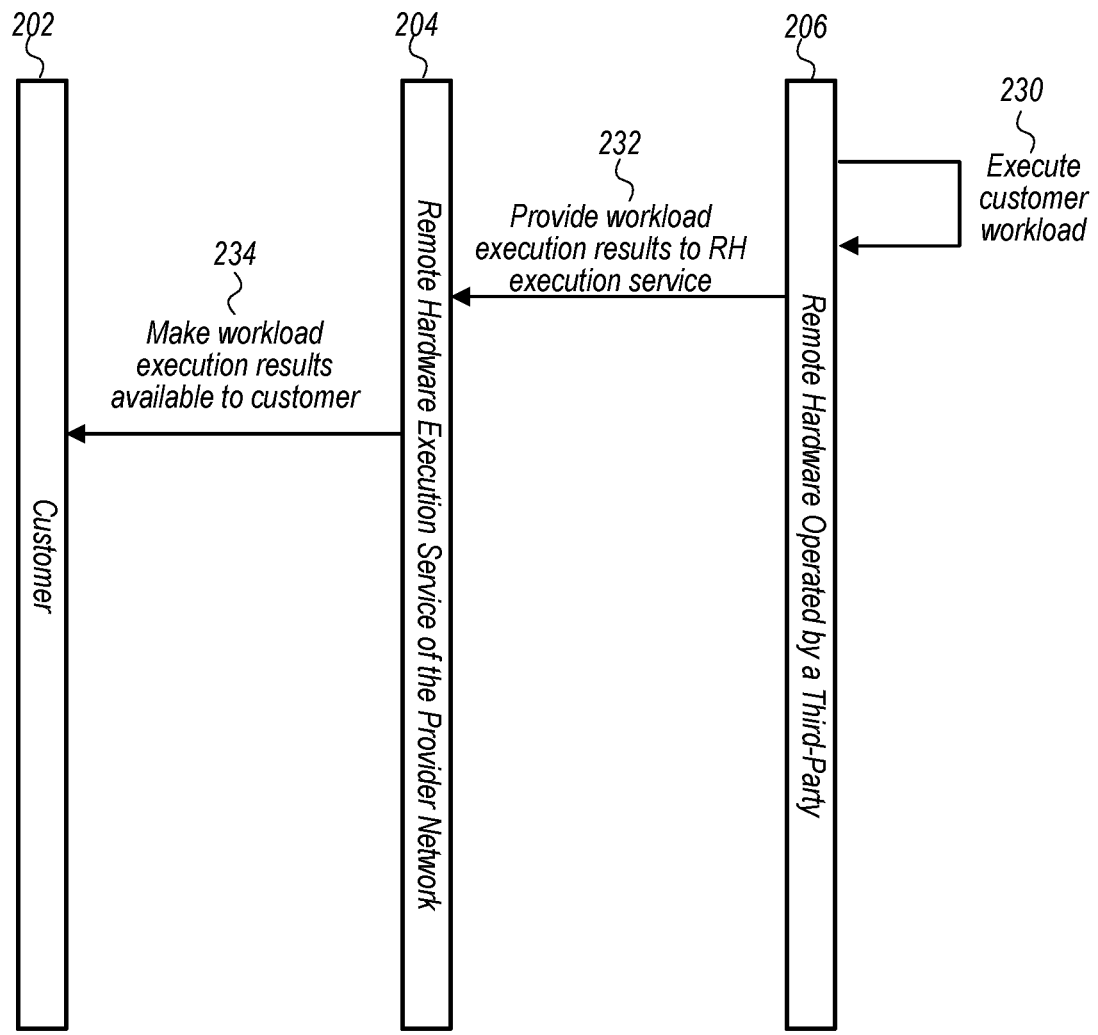

FIGS. 2A-2B illustrates example interactions between a customer, a remote hardware execution service, and remote hardware in order to execute a workload of a customer at the remote hardware and to enable debugging at the remote hardware during execution of the workload with the customer's consent, according to some embodiments.

In FIGS. 2A-2B customer 202 may be a customer, such as customers 124 illustrated in FIG. 1. Also, remote hardware execution service of the provider network 204 may be a service such as remote hardware execution service 104 of provider network 102 illustrated in FIG. 1. Also the remote hardware operated by a third-party 206, may be remote hardware, such as remote hardware 118 illustrated in FIG. 1.

In some embodiments, an interaction flow as shown in FIGS. 2A and 2B may be used by a remote hardware execution service for a customer to submit a workload and authorize debugging to be performed during the execution of the customer's workload.

At 208, the customer 202 provides customer information to authenticate the customer and verify customer privileges, such as authority to use the remote hardware execution service. At 210, the remote hardware execution service 204 verifies the customer's identity/authenticates the customer 202 and verifies the customer 202's authority to utilize the remote hardware service 204.

At 212, the customer 202 submits a workload to be executed on remote hardware 206 using the remote hardware execution service 204. The workload may be submitted to a workload submission interface, such as workload submission interface 106. The submission of the workload may indicate that the customer opts-into allowing debugging with customer consent. For example, opting into-debugging with customer consent may not enable debugging, but enables debugging to be authorized if additional customer consent is given. In some embodiments, if debugging with customer consent is not opted into, debugging may be blocked while the customer workload is being executed regardless of consent.

At 214, the remote hardware execution service creates and stores a secret portion for the customer in a logically-sealed container, such as in sealed customer secret container 130. Also, prior to submitting the customer's workload for execution at the remote hardware 206, at 216 the remote hardware execution service 204 performs a remote attestation process to verify the identity of the remote hardware 206 that is to receive the customer workload for execution. In some embodiments, the remote hardware may comprise a root of trust, and the root of trust may be used to verify the identity of the remote hardware 206 as part of the remote attestation process.

At 218, the remote hardware execution service 204 may request consent from the customer 202 to enable debugging while executing the customer's workload. At 220, the customer may provide consent.

Before generating a consent token, the remote hardware execution service may, at 222, verify the remote attestation. Also, the remote hardware execution service may, for example using a consent manager 114 and consent token generator 138, verify that a threshold number of portions/shares of the secret have been unsealed in order to reconstruct the secret and generate the consent token. If these conditions are met, at 224 the remote hardware execution service 204 generates the consent token and, at 226, provides the generated consent token to the remote hardware 206.

At 228 debugging is performed while executing the customer's workload. Then at 230, the customer's workload is executed, once the bugs are resolved. At 232, workload execution results are provided from the remote hardware 206 to the remote hardware service 204. Also, at 234, the remote hardware service 204 makes the execution results available to customer 202. In some embodiments, the execution results may be provided directly to customer 202 without first being provided to the remote hardware execution service 204.

FIG. 3 illustrates an example secret sharing scheme that may be used to generate a secret and secret portions, according to some embodiments.

As can be seen in FIG. 3, in some embodiments, a secret 304 may be generated using a curve generated using a cryptographic algorithm 304, such as Shamir' Secret Sharing algorithm, or other suitable secret sharing algorithm. In some embodiments, some of the shares of the secret may be assigned to the customer while other shares are assigned to other entities. For example, shares 306 are assigned to the customer, whereas share 310 is assigned to a technician, and share 308 is assigned to the service. In some embodiments, a minimum number of shares is required to recreate the secret. For example, when a parabola is used as shown in FIG. 3, three shares of the secret may be required to recreate the parabola and determine the secret 304. Since the customer is assigned two shares of the secret, the customer's two shares may be required along with an additional share, such as the technician's share 310 or the service's share 308. As long as the customer is assigned two shares, and the other two entities are assigned a single share, the secret cannot be recreated without the customer's consent. For example, even if both the technician's share 310 and the service's share 308 are provided, the parabola cannot be recreated without the customer's shares 310. For example two points would define a line, but not a parabola.

Note that in other embodiments, other secret sharing algorithms that may generate other shapes, such as a cubic shape, may be used. These other algorithms may require a different minimum number of shares to recreate a secret.

Figure 4:
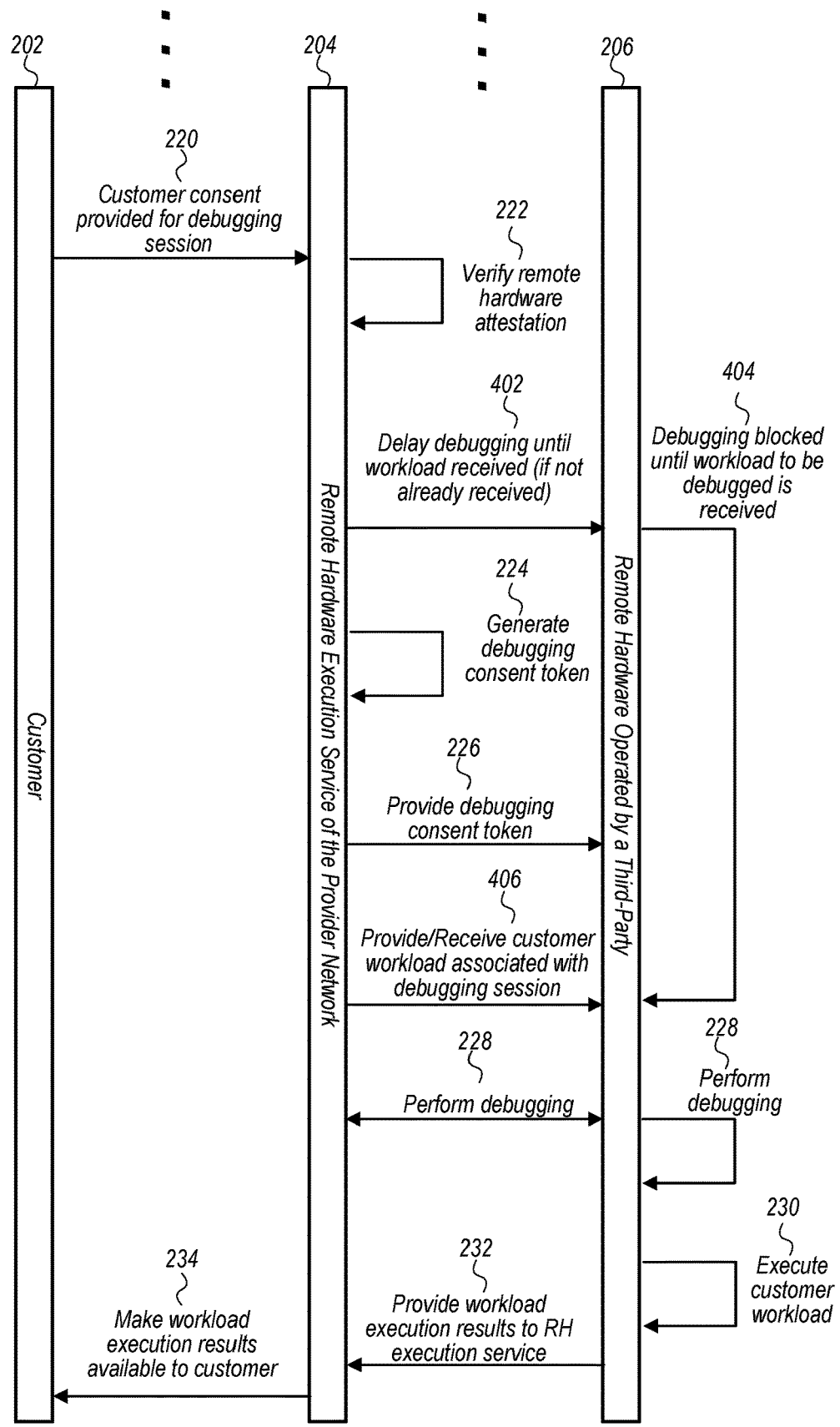
FIG. 4 illustrates example interactions between a customer, a remote hardware execution service, and remote hardware, wherein initiating a remote attestation process at the remote hardware causes the remote hardware to block debugging until a workload and associated consent token are received indicating that debugging has been approved for the workload by a customer associated with the workload, according to some embodiments.

FIG. 4 illustrates example interactions between a customer, a remote hardware execution service, and remote hardware, wherein initiating a remote attestation process at the remote hardware causes the remote hardware to block debugging until a workload and associated consent token are received indicating that debugging has been approved for the workload by a customer associated with the workload, according to some embodiments.

Similar steps as shown in FIGS. 2A-2B are shown in FIG. 4. However, FIG. 4 adds additional steps to prevent a race condition between initiating remote hardware attestation and authorizing debugging. For example, initiating a remote hardware attestation may cause debugging to be blocked until a workload is received. This prevents debugging from being authorized after the attestation process has been started but before a workload is received. For example, a consent token may have been generated for a different workload but received at a remote hardware subsequent to attestation and incorrectly associated with a first workload for which attestation was initiated. By blocking debugging until the workload associated with the attestation arrives, this race condition is avoided.

For example, at 402, in response to the remote attestation verification being initiated at 222, the remote hardware execution service 204 instructs remote hardware 206 to delay debugging until a workload associated with the remote attestation is received at the remote hardware. Accordingly, at 404 the remote hardware 206 blocks debugging until the associated workload is received. At 406, the associated workload is provided from the remote hardware execution service 204 and received at the remote hardware 206. At 228, debugging is then performed and the customer workload is executed in a similar manner as described in FIGS. 2A-2B.

Figure 5:
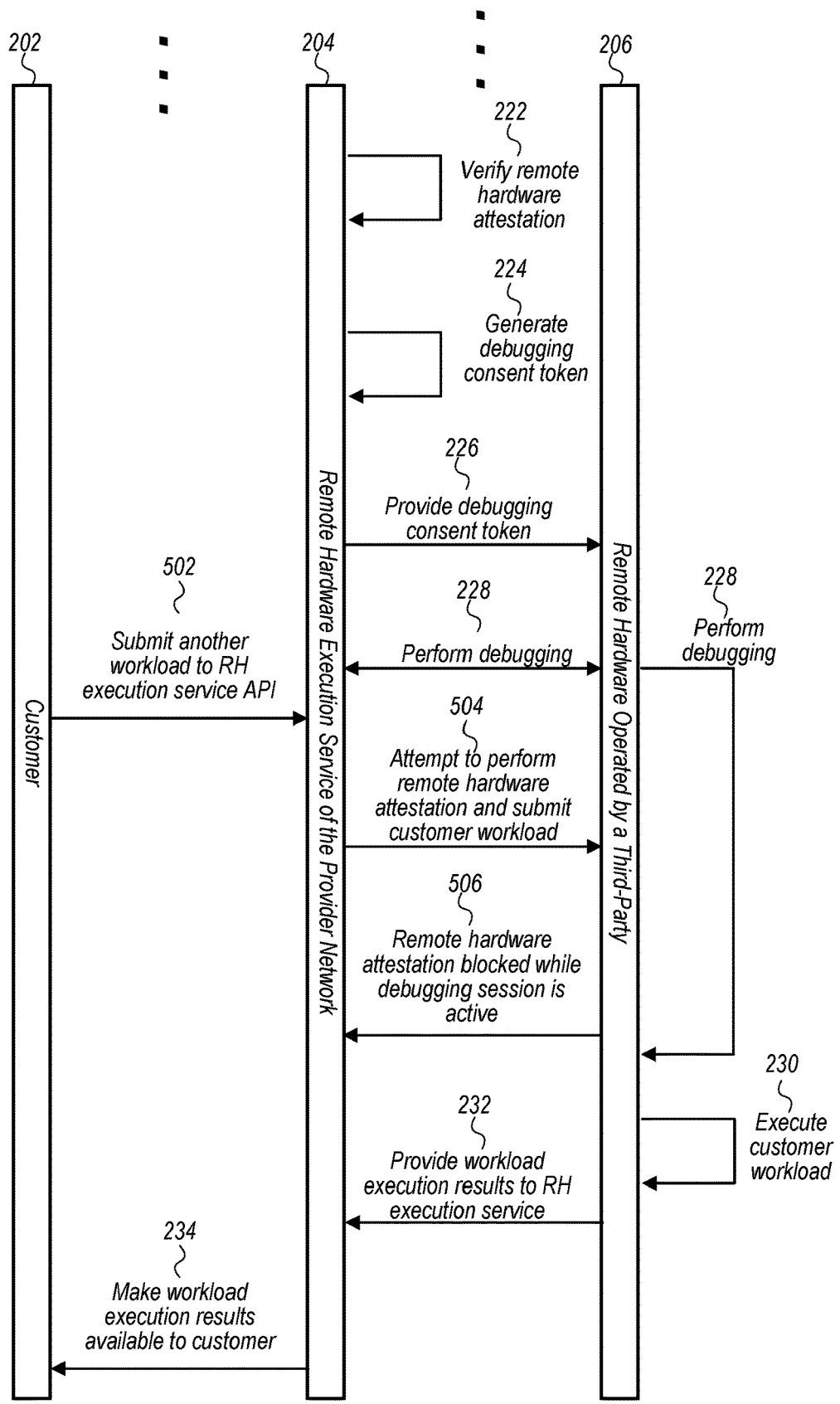
FIG. 5 illustrates example interactions between a customer, a remote hardware execution service, and remote hardware, wherein remote attestation is blocked from being successfully performed while a debugging session is active at the remote hardware, according to some embodiments.

FIG. 5 illustrates example interactions between a customer, a remote hardware execution service, and remote hardware, wherein remote attestation is blocked from being successfully performed while a debugging session is active at the remote hardware, according to some embodiments.

In a similar manner as described in FIG. 4, in order to avoid a race condition, in some embodiments, once debugging has been authorized at the remote hardware 206, subsequent attempts to perform remote attestation may fail while the debugging is authorized at the remote hardware 206.

For example, at 502 a customer may submit another workload to be executed at remote hardware 206 and at 504 a request to perform remote attestation may be submitted to remote hardware 206, while debugging 228 is being performed. At 506, the remote hardware attestation may fail due to debugging currently being authorized at the remote hardware 206.

Figure 6:
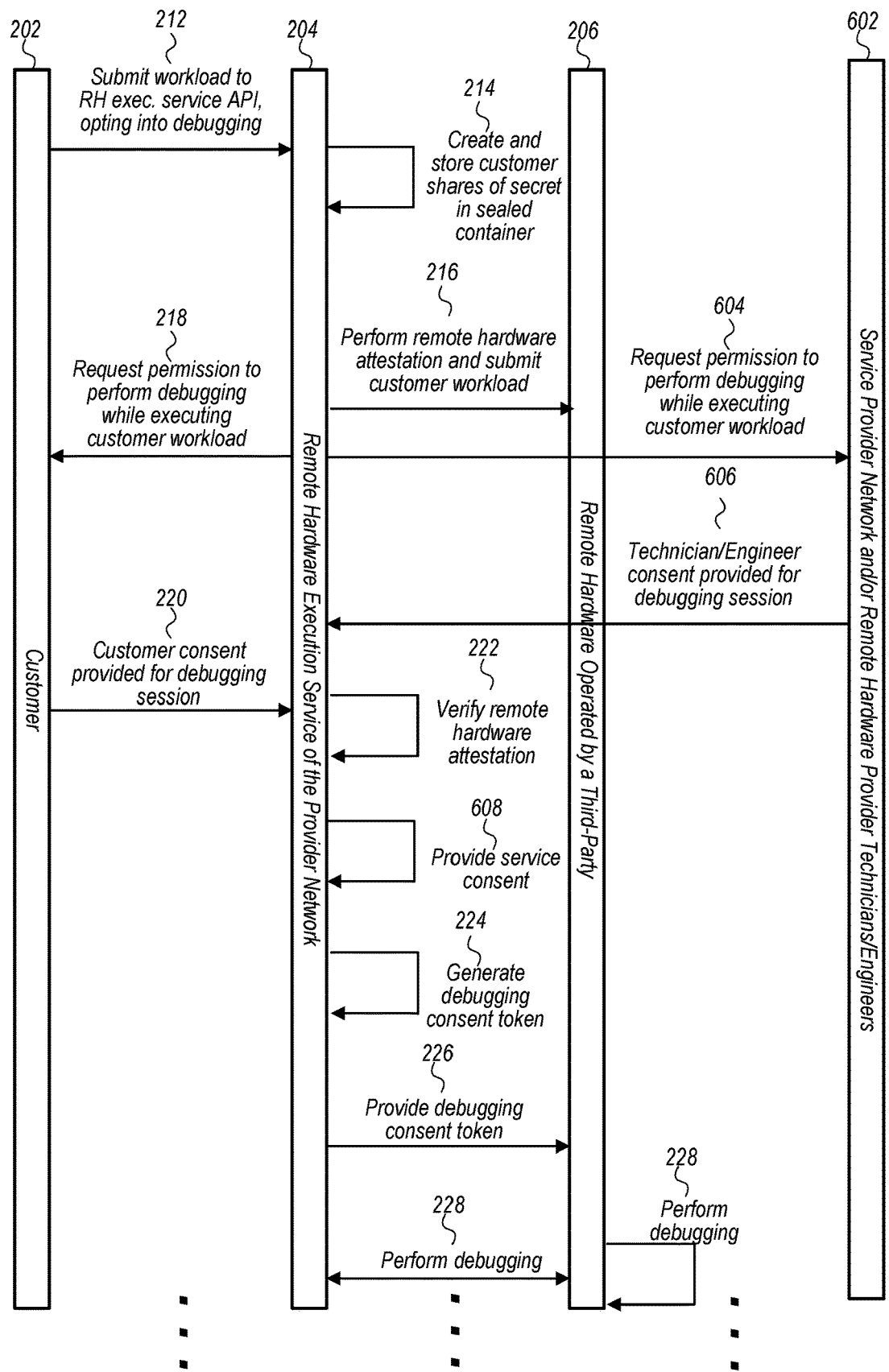
FIG. 6 illustrates example interactions between a customer, a remote hardware execution service, remote hardware, and an engineer/technician in order to enable debugging at the remote hardware during execution of a workload with a customer's consent and the consent of the engineer/technician and/or consent of the remote hardware execution service, according to some embodiments.

FIG. 6 illustrates example interactions between a customer, a remote hardware execution service, remote hardware, and an engineer/technician in order to enable debugging at the remote hardware during execution of a workload with a customer's consent and the consent of the engineer/technician and/or consent of the remote hardware execution service, according to some embodiments.

As described above, in some embodiments, a technician's consent may be provided to authorize debugging in addition to, or instead of, requiring the remote hardware execution service to provide consent. For example, FIG. 6 illustrates a similar flow as illustrated in FIGS. 2A-2B. However, FIG. 6 additionally includes interactions with technician/engineer 602.

For example, at 604, the remote hardware execution service 204 may request consent from technician/engineer 602 and at 606 the technician/engineer 602 may provide consent to authorize debugging. In some embodiments, the technician/engineer may initiate the process of acquiring consent and may cause the request for consent 218 to be sent to the customer 202. In other embodiments, the customer or the remote hardware execution service may initiate the process of acquiring consent to authorize debugging.

Also shown in FIG. 6, at 608, the service may provide consent to authorize the debugging. As discussed above in some embodiments, depending on how shares of the divided secret are allocated, consent may be required from the customer and either the service or the technician/engineer, or both.

FIG. 7 illustrates an example network architecture for a remote hardware execution service with edge devices physically located at remote hardware provider locations, according to some embodiments.

In some embodiments, service provider network 102, as illustrated in FIG. 1 may include one or more data centers connected to each other via private or public network connections. Also, edge computing devices located at remote hardware provider locations may be connected to a service provider network via private or public network connections. For example, service provider network 700 illustrated in FIG. 7 includes data centers 706a, 706b, and 706c that are connected to one another via private physical network links of the service provider network 700. In some embodiments, a customer of the service provider network may also be connected via a private physical network link that is not available to the public to carry network traffic, such as a physical connection at a router co-location facility. For example, customer 710 is connected to a router associated with data center 706c via direct connection 722. In a similar manner, edge computing devices located at remote hardware provider locations may be connected to a service provider network via a private physical network link that is not available to carry public network traffic.

For example, edge computing device 704a located at remote hardware provider location 702a is connected to a router at data center 706a via direct connection 716. In a similar manner, edge computing device 704b at remote hardware provider location 702b is connected to a router at data center 706b via direct connection 718. Also, edge computing device 704c at remote hardware provider 702c is connected to a router at data center 706c via direct connection 720.

Also, in some embodiments an edge computing device of a service provider network located at a remote hardware provider location may be connected to the service provider network via a logically isolated network connection over a shared network connection, such as via the Internet or another public network. For example, edge computing device 704d at remote hardware provider location 702d is connected to data center 706c via a logically isolated network connection via network 714. In a similar manner, in some embodiments a customer, such as customer 708, may be connected to service provider network 700 via public network 712.

In some embodiments, a remote hardware execution service such as remote hardware execution service 104, may be implemented using one or more computing devices in any of data centers 706a, 706b, 706c, etc. Also the remote hardware execution service 104, may provide customers, such as customer 708 or customer 710, access to remote hardware in any of remote hardware provider locations 702a, 702b, 702c, 702d, etc. For example, a customer may not be restricted to using a remote hardware provider in a local region where the customer is located. Instead, the customer may be allocated compute instances instantiated on a local edge computing device located at a selected remote hardware provider location, such that the location of the customer does not restrict the customer's access to various types of remote hardware computing technology.

In some embodiments, the remote hardware may be a quantum computer operated by a quantum hardware provider associated with remote hardware execution service 104 and/or service provider network 102. Also, in some embodiments, the remote hardware may be specialized classical computing hardware, or hardware that is being tested as part of a hardware testing service.

Figure 8:
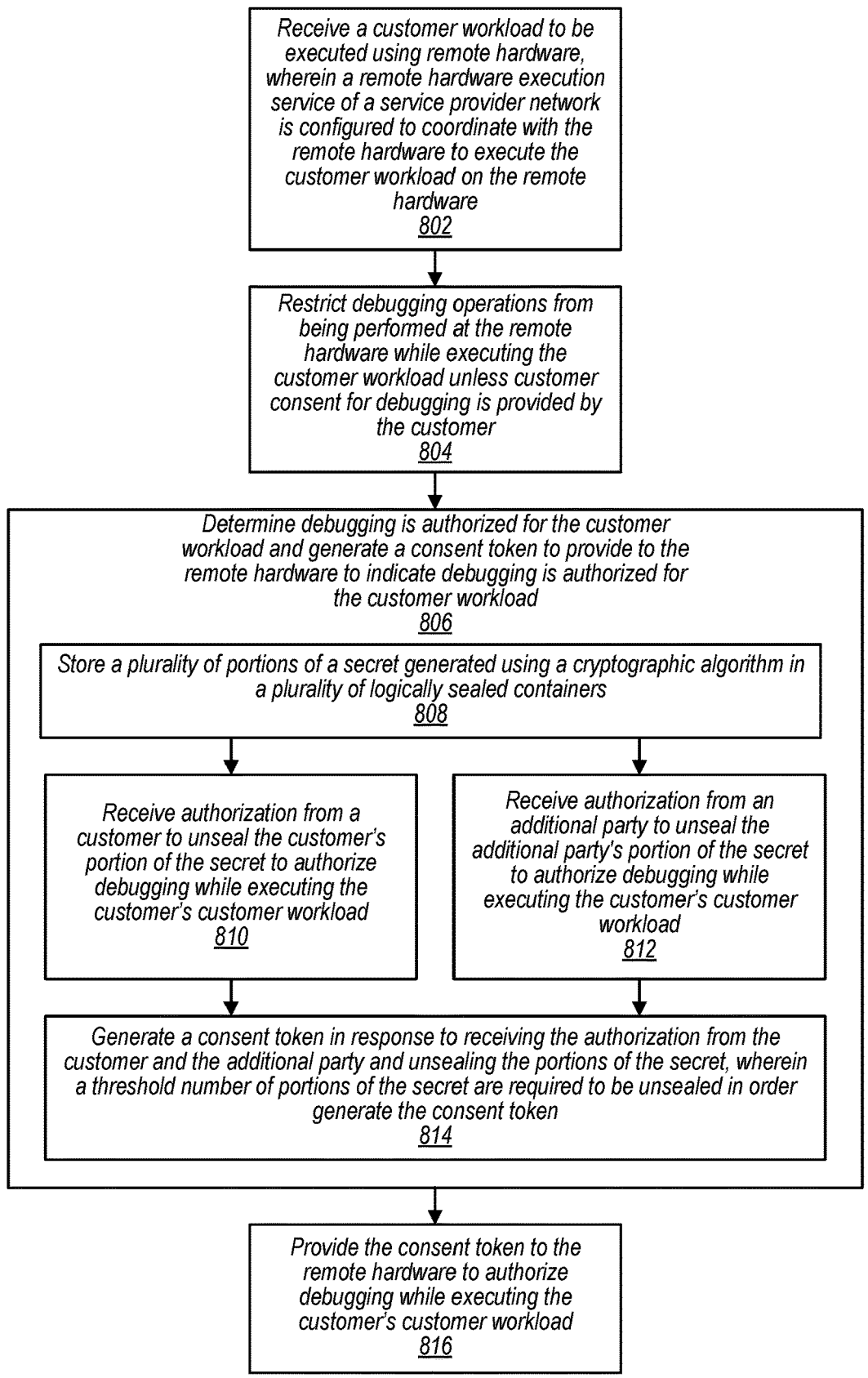
FIG. 8 illustrates a process of enabling debugging with customer consent for a workload of a customer being executed on remote hardware, according to some embodiments.

FIG. 8 illustrates a process of enabling debugging with customer consent for a workload of a customer being executed on remote hardware, according to some embodiments.

At 802, a remote hardware execution service receives a customer workload to be executed using remote hardware, wherein a remote hardware execution service of a service provider network is configured to coordinate with the remote hardware to execute the customer workload on the remote hardware.

At 804, the remote hardware restricts debugging operations from being performed at the remote hardware while executing the customer workload unless customer consent for debugging is provided by the customer.

At 806, the remote hardware execution service determines whether debugging is authorized for the customer workload and generates a consent token to provide to the remote hardware to indicate debugging is authorized for the customer workload, if consent is provided from the customer.

As part of determining debugging is authorized, at 808, the remote hardware execution service stores a plurality of portions of a secret generated using a cryptographic algorithm in a plurality of logically sealed containers.

At 810, the remote hardware execution service receives authorization from a customer to unseal the customer's portion of the secret to authorize debugging while executing the customer's customer workload.

At 812, the remote hardware execution service receives authorization from an additional party to unseal the additional party's portion of the secret to authorize debugging while executing the customer's customer workload.

At 814, the remote hardware execution service generates a consent token in response to receiving the authorization from the customer and the additional party and unsealing the portions of the secret, wherein a threshold number of portions of the secret are required to be unsealed in order generate the consent token.

At 816, the remote hardware execution service provides the consent token to the remote hardware to authorize debugging while executing the customer's customer workload.

Figure 9:
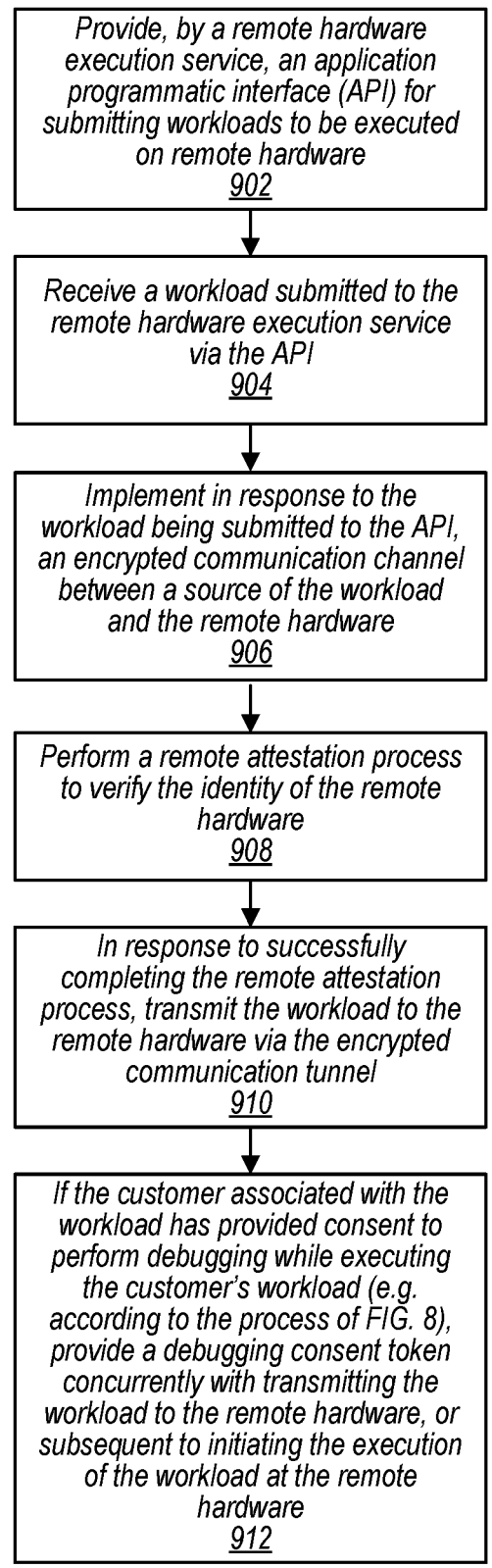
FIG. 9 illustrates a process of receiving a workload of a customer to be executed at a remote hardware provider and transmitting the workload to the remote hardware provider with a debugging consent token, if the customer has given consent for debugging to be performed while executing the workload, according to some embodiments.

FIG. 9 illustrates a process of receiving a workload of a customer to be executed at a remote hardware provider and transmitting the workload to the remote hardware provider with a debugging consent token, if the customer has given consent for debugging to be performed while executing the workload, according to some embodiments.

At 902, a remote hardware execution service provides an application programmatic interface (API) for submitting workloads to be executed on remote hardware.

At 904, the remote hardware execution service receives a workload submitted to the remote hardware execution service via the API.

At 906, the remote hardware execution service implements in response to the workload being submitted to the API, an encrypted communication channel between a source of the workload and the remote hardware.

At 908, the remote hardware execution service performs a remote attestation process to verify the identity of the remote hardware.

At 910, the remote hardware execution service, in response to successfully completing the remote attestation process, transmits the workload to the remote hardware via the encrypted communication tunnel.

At 912, if the customer associated with the workload has provided consent to perform debugging while executing the customer's workload (e.g. according to the process of FIG. 8), the remote hardware execution service provides a debugging consent token concurrently with transmitting the workload to the remote hardware, or subsequent to initiating the execution of the workload at the remote hardware.

Figure 10:
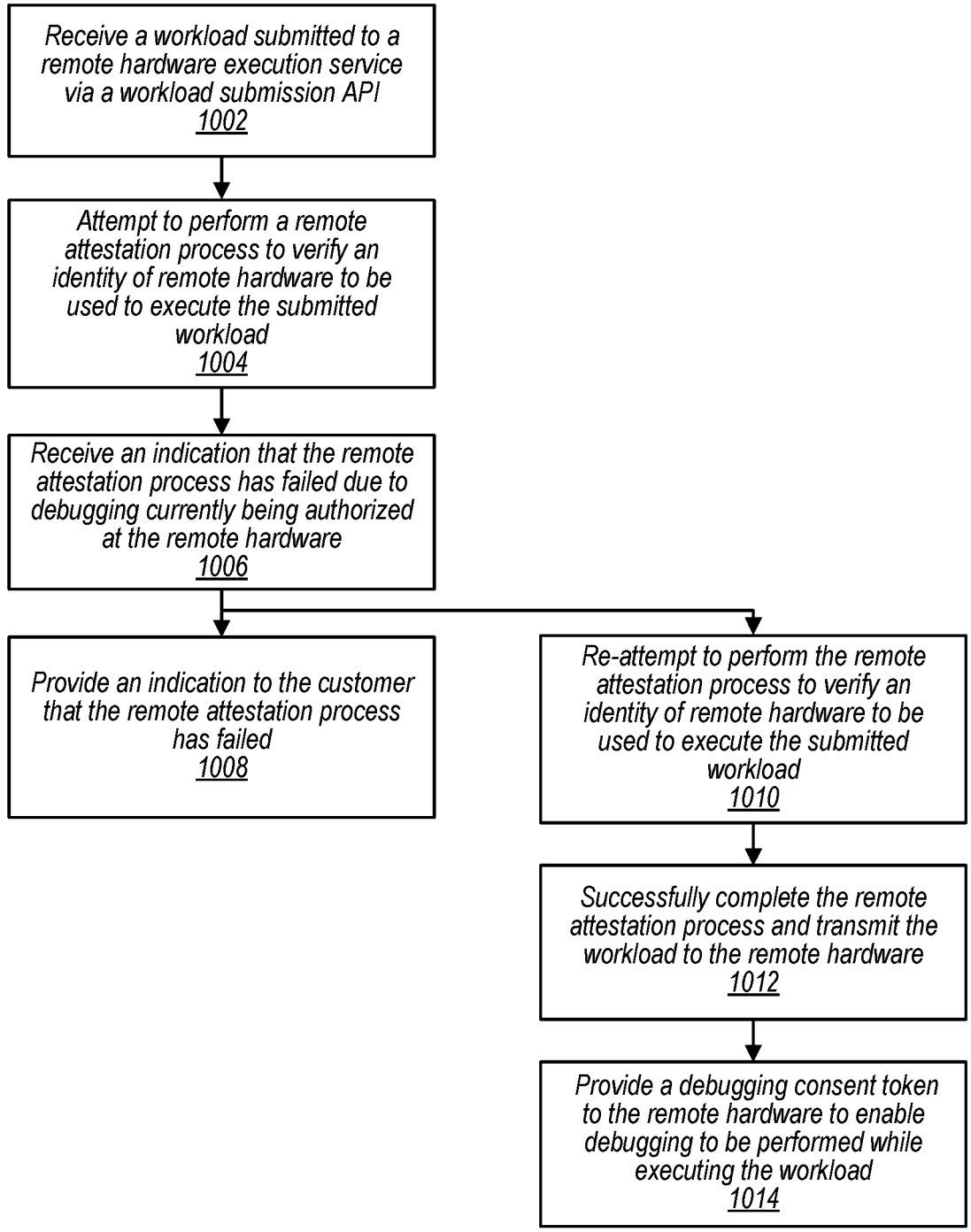
FIG. 10 illustrates additional process steps, wherein remote attestation cannot be successfully performed while debugging is currently authorized at the remote hardware, according to some embodiments.

FIG. 10 illustrates additional process steps, wherein remote attestation cannot be successfully performed while debugging is currently authorized at the remote hardware, according to some embodiments.

At 1002, a remote hardware execution service receives a workload submitted to a remote hardware execution service via a workload submission API.

At 1004, the remote hardware execution service attempts to perform a remote attestation process to verify an identity of remote hardware to be used to execute the submitted workload.

At 1006, the remote hardware executions service receives an indication or determines that the remote attestation process has failed due to debugging currently being authorized at the remote hardware.

Optionally, at 1008, the remote hardware execution service provides an indication to the customer that the remote attestation process has failed.

Also, optionally, at 1010 through 1014, the remote hardware execution service re-attempts the remote attestation. For example, at 1010, the remote hardware execution service re-attempts to perform the remote attestation process to verify an identity of remote hardware to be used to execute the submitted workload. Also, as another option the remote hardware execution service may attempt to submit the workload to another piece of remote hardware at the same or different remote hardware provider. In such cases, an attempt to perform the remote attestation process may be initiated for the other piece of remote hardware.

If the re-attempt is successful, at 1012, the remote hardware execution service successfully completes the remote attestation process and transmit the workload to the remote hardware. Also, if an attempt to perform the remote attestation for another piece of remote hardware is successful, the remote hardware execution service proceeds to submit the workload to the other remote hardware.

At 1014, the remote hardware execution service provides a debugging consent token to the remote hardware to enable debugging to be performed while executing the workload.

Figure 11:
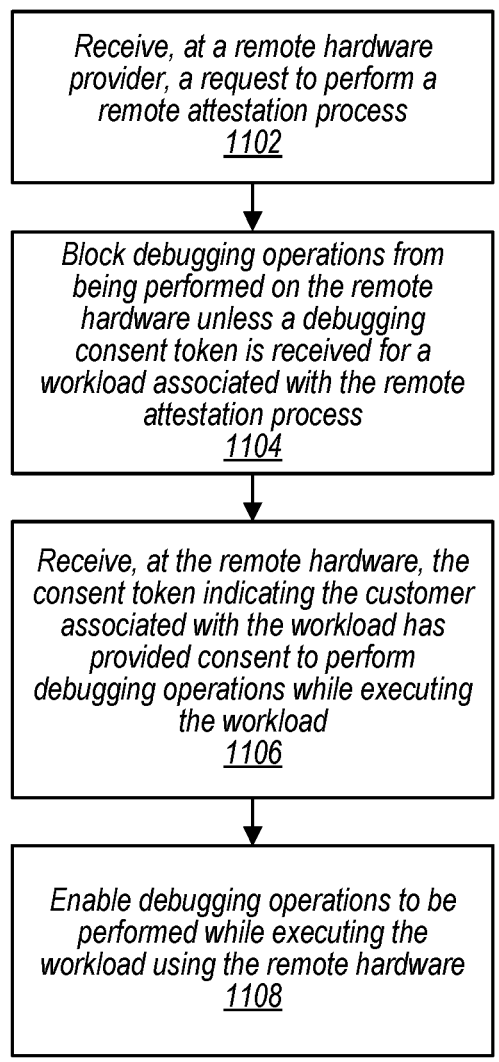
FIG. 11 illustrates additional process steps, wherein initiating a remote attestation process at remote hardware causes the remote hardware to block debugging operations until a workload and associated debugging consent token are received at the remote hardware, according to some embodiments.

FIG. 11 illustrates additional process steps, wherein initiating a remote attestation process at remote hardware causes the remote hardware to block debugging operations until a workload and associated debugging consent token are received at the remote hardware, according to some embodiments.

At 1102, the remote hardware provider receives a request to perform a remote attestation process. For example, a customer may have submitted a workload to be executed at the remote hardware provider to a remote hardware execution service that initiates the remote attestation process.

At 1104, the remote hardware/remote hardware provider blocks debugging operations from being performed on the remote hardware unless a debugging consent token is received for a workload associated with the remote attestation process.

At 1106, the remote hardware/remote hardware provider receives the consent token indicating the customer associated with the workload has provided consent to perform debugging operations while executing the workload.

At 1108, the remote hardware/remote hardware provider enables debugging operations to be performed while executing the workload using the remote hardware.

Illustrative Computer System

Figure 12:
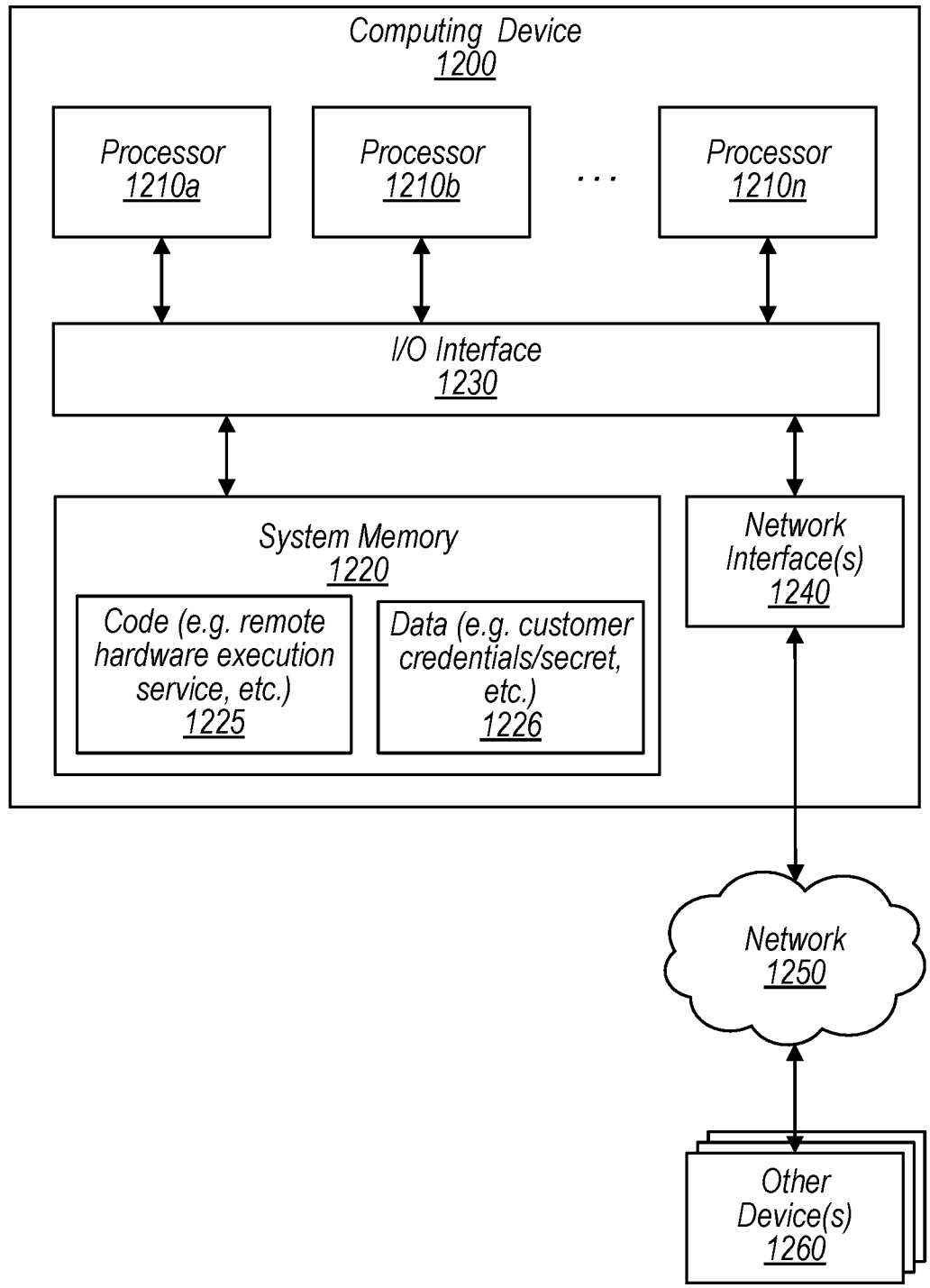
FIG. 12 is a block diagram illustrating an example computing device that may be used in at least some embodiments.

FIG. 12 is a block diagram illustrating an example computing device that may be used in at least some embodiments.

FIG. 12 illustrates such a general-purpose computing device 1200 as may be used in any of the embodiments described herein. In the illustrated embodiment, computing device 1200 includes one or more processors 1210 coupled to a system memory 1220 (which may comprise both non-volatile and volatile memory modules) via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors.

System memory 1220 may be configured to store instructions and data accessible by processor(s) 1210. In at least some embodiments, the system memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1220 as code 1225 and data 1226. For example, in some embodiments, system memory 1220 and code 1225 more store instructions for implementing a service provider network 102, other services 116 of the service provider network 102, etc. In some embodiments, system memory 1220 and code 1225 more store instructions for implementing remote hardware execution service 102 and/or remote hardware debugging 110. For example in some embodiments data 1226 may include logically sealed portions of the secrets 130, 132, and 134. Also, in some embodiments, data 1226 of the same or a different computing device may store results of the execution of the customer workload.

In some embodiments, I/O interface 1230 may be configured to coordinate I/O traffic between processor 1210, system memory 1220, and any peripheral devices in the device, including network interface 1240 or other peripheral interfaces such as various types of persistent and/or volatile storage devices. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 through FIG. 11, for example. For example, in some embodiments, network interfaces 1240 may enable communications between a service provider network and a remote hardware provider network, for example using a back-end API transport. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a service provider network comprising one or more computing devices configured to:
coordinate with remote hardware operated by a third-party to execute workloads of customers of the service provider network;
receive from a customer of the service provider network one or more workloads to be executed using the remote hardware operated by the third-party, and
enable, with the consent of the customer, debugging operations to be performed at the remote hardware while the workload of the customer is being executed;
wherein the remote hardware is configured to block debugging operations during the execution of the customer's workload unless a token indicating the customer's consent for debugging during execution of the customer's workload is provided; and
wherein the one or more computing devices are further configured to:
store a plurality of portions of a secret in separate logically-sealed containers, wherein a threshold number of the portions of the secret are required to be unsealed in order for the token to be generated;
receive authorization from the customer indicating consent to unseal the customer's portion of the secret;
receive authorization from another party indicating consent to unseal another portion of the secret;
determine that unsealed portions of the secret satisfy a threshold number of the portions of the secret required to generate the token, wherein the threshold number cannot be satisfied without the customer's portion of the secret;
generate, in response to determining the unsealed portions of the secret satisfy the threshold number of portions, the token indicating the customer's consent for debugging operations to be performed during execution of the customer's workload; and
provide the token to the remote hardware operated by the third-party to enable debugging to be performed while the workload of the customer is being executed.

2. The system of claim 1, wherein the remote hardware operated by the third-party comprises a quantum computer operated by a quantum hardware provider associated with a quantum computing service of the service provider network.

3. The system of claim 1, wherein the remote hardware operated by the third-party comprises classical computing hardware, and wherein the one or more computing devices of the provider network are configured to implement a classical computing hardware testing service for testing the classical computing hardware of the third-party.

4. The system of claim 1, wherein the one or more computing devices are further configured to:
receive authorization from a technician of the service provider indicating consent to unseal an additional portion of the secret;
wherein in order to satisfy the threshold number of portions of the secret required to be unsealed to generate the token, the one or more computing devices are required to unseal the customer's portion of the secret; and
unseal the service provider's portion of the secret; or
unseal the technician's portion of the secret.

5. The system of claim 4, wherein the customer's portion of the secret comprises more shares of the secret than are included in the service provider's portion of the secret or the technician's portion of the secret, and
wherein to satisfy a requirement for the threshold number of the portions of the secret to be unsealed in order for the token to be generated, a number of unsealed shares of the secret is required to exceed a threshold number of unsealed shares of the secret, wherein the threshold cannot be reached without the unsealed shares of the secret of the customer.

6. A method, comprising:
receiving, from a customer of a service provider network, a workload to be executed using remote hardware wherein the service provider network is configured to coordinate with the remote hardware to execute the customer's workload;
restricting debugging operations from being performed on the remote hardware while executing the customer workload unless a token indicating authorization for performing debugging operations during execution of the customer's workload is provided;

storing a plurality of portions of a secret in separate logically-sealed containers, wherein a threshold number of the portions of the secret are required to be unsealed in order for the token indicating authorization for performing debugging operations to be generated;

receiving authorization from the customer indicating consent to unseal the customer's portion of the secret;

receiving authorization from a service of the service provider network or a technician of the service provider indicating consent to unseal another portion of the secret;

generating the token in response to determining the unsealed portions of the secret satisfy the threshold number of portions; and providing the token to the remote hardware to enable debugging to be performed while the workload of the customer is being executed.

7. The method of claim 6, wherein the secret is generated by a cryptographic algorithm and divided into shares, wherein each of the portions of the secret comprise one or more shares of the secret, and wherein the threshold number of portions of the secret required to be unsealed to generate the token is less than a total number of shares into which the secret was divided.

8. The method of claim 7, wherein:

the customer's portion of the secret comprises more shares of the secret than are included in the service provider's portion of the secret or the technician's portion of the secret, such that the threshold number of portions of the secret required to be unsealed to generate the token cannot be satisfied without the customer's portion of the secret.

9. The method of claim 6, wherein the remote hardware comprises a quantum computer operated by a quantum hardware provider associated with a quantum computing service offered by the service provider network.

10. The method of claim 9, wherein the customer workload comprises a quantum algorithm to be executed on the quantum computer of the quantum hardware provider; and wherein said restricting the debugging operations from being performed on the remote hardware while executing the customer workload prevents access to the quantum algorithm of the customer or results of executing the quantum algorithm of the customer on the quantum computer of the quantum hardware provider.

11. The method of claim 6, comprising:

providing, by the service provider network, an application programmatic interface (API) for the submission of the customer workload;

implementing, in response to receiving a submission of the customer workload to the API, an encrypted communication tunnel to the remote hardware;

performing a remote attestation process to verify an identity of the remote hardware; and transmitting the customer workload to the remote hardware via the encrypted communication tunnel in response to successfully completing the remote attestation process.

12. The method of claim 11, further comprising:

in response to initiating the remote attestation process, blocking debugging operations from being performed at the remote hardware provider;

wherein, subsequent to successfully completing the remote attestation process, the remote hardware receives the customer workload and the token and enables debugging to be performed on the remote hardware while executing the customer workload with the customer's consent.

13. The method of claim 12, wherein the remote hardware comprise a root of trust, and wherein the remote attestation process verifies the root of trust of the remote hardware to verify the identity of the remote hardware.

14. The method of claim 11, further comprising:

receiving another customer workload to be executed using the remote hardware via the API;

attempting to perform a remote attestation process for the other customer workload;

receiving an indication from the remote hardware that debugging is currently activated at the remote hardware; and providing an indication to the customer that the remote attestation process has failed, wherein the remote attestation process is not configured to successfully complete while debugging is activated at the remote hardware.

15. The method of claim 6, further comprising:

receiving from the customer an indication to opt into enabling a debugging service that performs debugging with the customer's consent while executing the customer's workload, wherein the service provider network is configured to refrain from enabling the debugging service to receive the authorization from the customer and generate the token unless opted into by the customer to enable the debugging service.

16. The method of claim 6, comprising:

performing debugging while the customer's workload is being executed, wherein the debugging provides the technician access to internal states and traces of the remote hardware during the execution of the customer's workload.

17. The method of claim 6, wherein the secret is generated using Shamir's secret sharing algorithm.

18. One or more non-transitory, computer-readable storage media, storing program instructions that when executed on or across one or more computing devices cause the one or more computing devices to:

cause debugging operations to be restricted from being performed on remote hardware while executing a customer workload on the remote hardware;

cause a plurality of portions of a secret to be stored in separate logically-sealed containers, wherein a threshold number of the portions of the secret are required to be unsealed in order for a token indicating authorization for performing debugging operations to be generated;

receive authorization from a customer indicating consent to unseal the customer's portion of the secret;

receive authorization from a service or a technician of the service provider indicating consent to unseal another portion of the secret;

generate the token in response to determining the unsealed portions of the secret satisfy the threshold number of portions; and provide the token to the remote hardware to enable debugging to be performed while a customer workload of the customer is being executed.

19. The one or more non-transitory, computer-readable media of claim 18, wherein the program instructions, when executed on or across the one or more computing devices, cause the one or more computing devices to:

provide the token to the remote hardware during the execution of the customer workload to enable debugging subsequent to the execution of the customer workload being initiated.

20. The one or more non-transitory, computer-readable media of claim 19, wherein the customer's portion of the secret comprises more shares of the secret than are included in the service's portion of the secret or the technician's portion of the secret, such that the threshold number of portions cannot be satisfied without the customer's portion of the secret.

\* \* \* \* \*